(12) United States Patent
Chue

(10) Patent No.: US 7,916,415 B1
(45) Date of Patent: Mar. 29, 2011

(54) DISK DRIVE DECODING BINARY SEQUENCE FROM PHASES OF SERVO BURSTS

(75) Inventor: Jack M. Chue, Los Altos, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 395 days.

(21) Appl. No.: 12/057,278

(22) Filed: Mar. 27, 2008

(51) Int. Cl.
*G11B 5/09* (2006.01)
*G11B 5/596* (2006.01)

(52) U.S. Cl. ........................ 360/48; 360/77.08
(58) Field of Classification Search .................... None
See application file for complete search history.

(56) References Cited

U.S. PATENT DOCUMENTS

| | | | |
|---|---|---|---|
| 4,879,612 A | 11/1989 | Freeze et al. | |
| 5,274,510 A | 12/1993 | Sugita et al. | |
| 5,381,281 A | 1/1995 | Shrinkle et al. | |
| 5,600,499 A | 2/1997 | Acosta et al. | |
| 5,862,005 A | 1/1999 | Leis et al. | |
| 5,903,410 A | 5/1999 | Blaum et al. | |
| 6,049,438 A | 4/2000 | Serrano et al. | |
| 6,141,176 A | 10/2000 | Blaum et al. | |
| 6,243,223 B1 | 6/2001 | Elliott et al. | |
| 6,288,861 B1 | 9/2001 | Blaum et al. | |
| 6,452,990 B1 | 9/2002 | Leis et al. | |
| 6,462,898 B2 * | 10/2002 | Blaum et al. | 360/77.08 |
| 6,496,312 B2 | 12/2002 | Blaum et al. | |
| 6,590,729 B1 | 7/2003 | Akagi et al. | |
| 6,614,609 B1 | 9/2003 | Reed et al. | |
| 6,775,081 B2 | 8/2004 | Ottesen et al. | |
| 6,856,480 B2 | 2/2005 | Kuki et al. | |
| 6,961,203 B1 | 11/2005 | Baker | |
| 7,027,257 B1 | 4/2006 | Kupferman | |
| 7,068,461 B1 | 6/2006 | Chue et al. | |
| 7,099,095 B1 | 8/2006 | Subrahmanyam et al. | |
| 7,167,329 B2 | 1/2007 | Baker | |
| 7,209,314 B2 | 4/2007 | Bandic et al. | |
| 7,236,325 B2 | 6/2007 | Albrecht et al. | |
| 7,242,546 B2 | 7/2007 | Ooi et al. | |
| 7,330,321 B2 * | 2/2008 | Ashiwa | 360/48 |
| 7,710,676 B1 | 5/2010 | Chue | |
| 2003/0035239 A1 | 2/2003 | Ottesen | |
| 2007/0211370 A1 | 9/2007 | Ryu et al. | |
| 2008/0002278 A1 | 1/2008 | Ueda et al. | |

OTHER PUBLICATIONS

Cunninham, Quad Burst Servo Needing No Sync ID and Having Added Information, Aug. 1, 1990, IBM Technical Disclosure Bulletin, vol. 33 No. 3B, pp. 198-200.*

A. H. Sacks, "Position Signal Generation in Magnetic Disk Drives," Ph.D. thesis, Carnegie Mellon University, Data Storage Systems Center, Department of Electrical and Computer Engineering, Carnegie Mellon University, Pittsburg, PA, Sep. 5, 1995.

Office Action dated May 18, 2009 from U.S. Appl. No. 12/057,213, 11 pages.

(Continued)

*Primary Examiner* — Daniell L Negrón (57) ABSTRACT

A disk drive is disclosed comprising a disk including a plurality of servo tracks defined by a plurality of servo sectors, wherein each servo sector comprises a plurality of servo bursts, and each servo burst comprises at least one of four phases. A first two of the phases are orthogonal, and a second two of the phases are orthogonal. As a head is actuated over the disk a servo sector is read to generate a read signal. The read signal is processed to demodulate the servo bursts into a position error signal (PES) representing an offset of the head from a target radial location on the disk, and the read signal is also processed to decode at least two of the phases of the servo bursts into a binary sequence.

26 Claims, 7 Drawing Sheets

OTHER PUBLICATIONS

Notice of Allowance dated Jan. 12, 2010 from U.S. Appl. No. 12/057,213, 4 pages.

Office Action dated Sep. 15, 2009 from U.S. Appl. No. 12/057,213, 8 pages.

* cited by examiner

DISK DRIVE DECODING BINARY SEQUENCE FROM PHASES OF SERVO BURSTS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Figure 1:
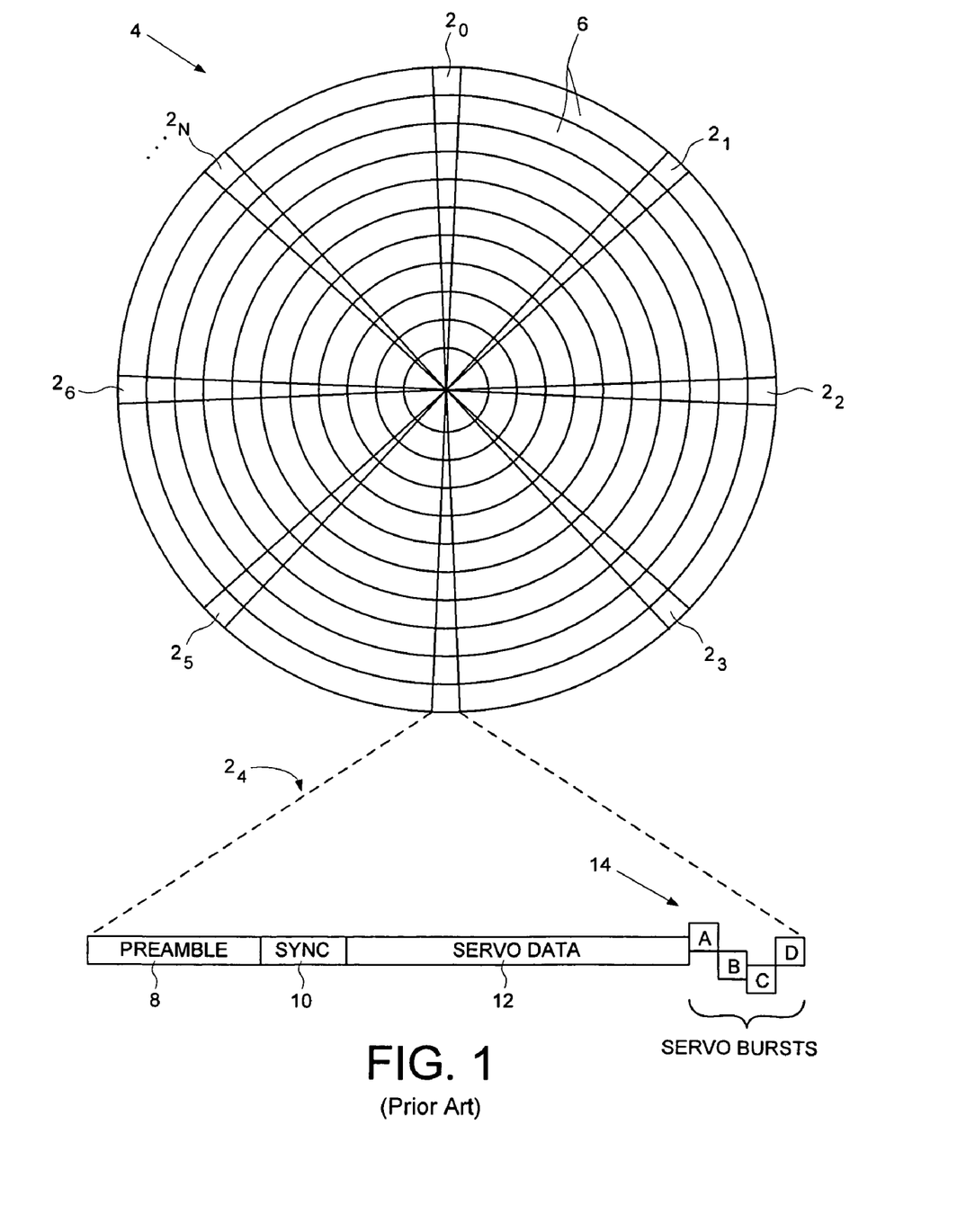
FIG. 1 shows a prior art disk format comprising a plurality of data tracks defined by a plurality of servo sectors comprising servo bursts.

FIG. 1 shows a prior art disk format 4 as comprising a number of servo tracks 6 defined by servo sectors $2_0$-$2_N$ recorded around the circumference of each servo track. Each servo sector $2_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 2, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

DETAILED DESCRIPTION OF EMBODIMENTS OF THE INVENTION

Figure 2A:
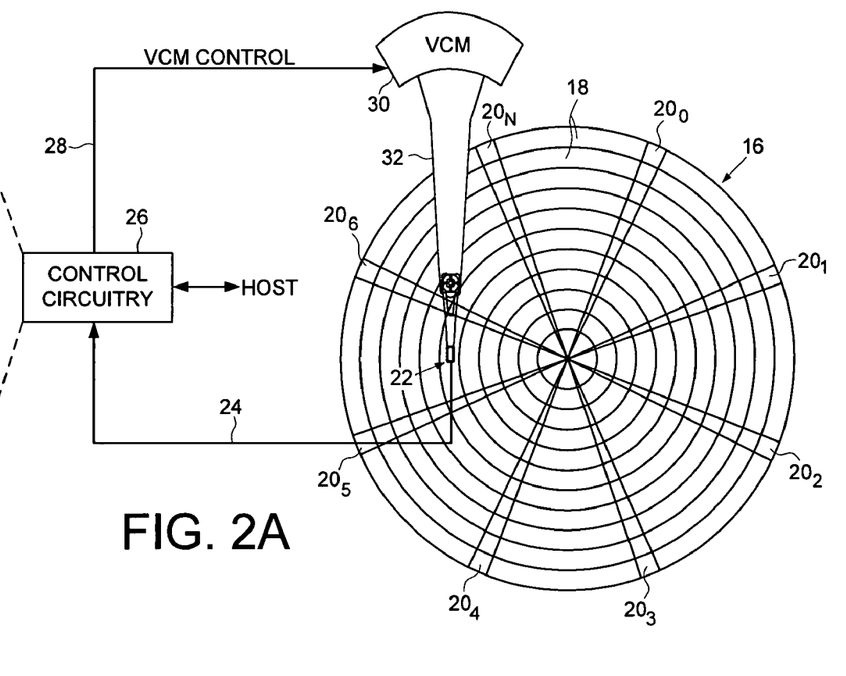
FIG. 2A shows a disk drive according to an embodiment of the present invention comprising a head actuated over the disk, and control circuitry.

FIG. 2A shows a disk drive according to an embodiment of the present invention comprising a disk 16 including a plurality of servo tracks 18 defined by a plurality of servo sectors $20_0$-$20_N$, wherein each servo sector comprises a plurality of servo bursts, and each servo burst comprises at least one of four phases. A first two of the phases are orthogonal, and a second two of the phases are orthogonal. As a head 22 is actuated over the disk 16 a servo sector is read to generate a read signal 24. The read signal 24 is processed by control circuitry 26 to demodulate the servo bursts into a position error signal (PES) representing an offset of the head 22 from a target radial location on the disk, and the read signal 24 is also processed to decode at least two of the phases of the servo bursts into a binary sequence. The control circuitry 26 filters the PES using a suitable compensation filter to generate a control signal 28 applied to a voice coil motor (VCM) 30 which rotates an actuator arm 32 about a pivot in order to move the head 22 radially in a direction that reduces the PES.

Figure 3A:
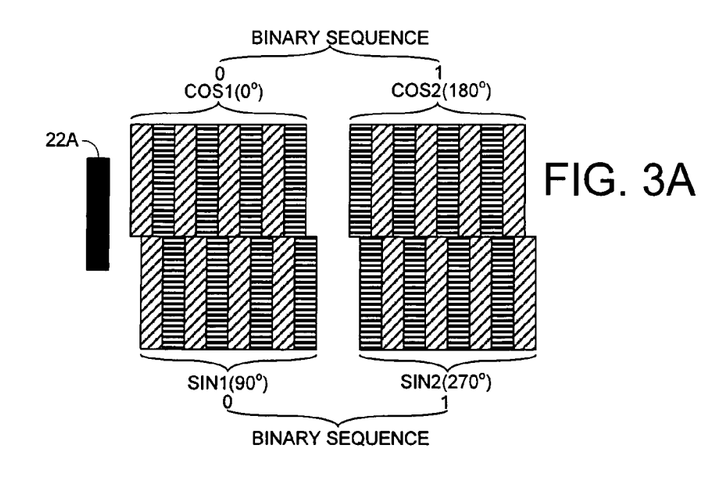
FIG. 3A shows an orthogonal phase servo pattern for a top and bottom servo track according to an embodiment of the present invention wherein each servo burst comprises one of four phases selected from the group consisting of 0 degrees, 90 degrees, 180 degrees, and 270 degrees which are decoded into a binary sequence.
Figure 3B:
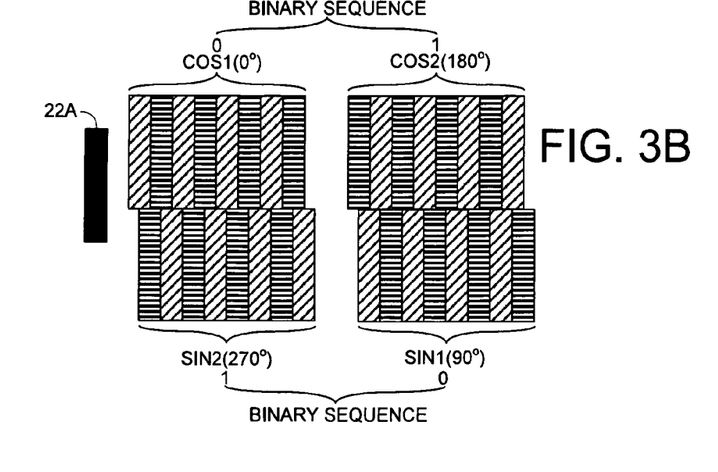
FIG. 3B shows an orthogonal phase servo pattern according to an embodiment of the present invention wherein the phases of the bottom servo track are decoded into a different binary sequence.

FIG. 3A shows an embodiment of the present invention wherein the servo bursts of adjacent servo tracks (top and bottom) comprise an orthogonal phase servo pattern. With an orthogonal phase servo pattern, each servo burst comprises one of four phases (e.g., 0 degrees, 90 degrees, 180 degrees, and 270 degrees), wherein the phases of the servo bursts in adjacent servo tracks are orthogonal (90 degrees offset). In the embodiment of FIG. 3A, each servo burst comprises a plurality of burst cycles, wherein a phase of each burst cycle is the same. Also in the embodiment of FIG. 3A, there are two servo bursts recorded along a first servo track (top servo track), and two servo bursts recorded along an adjacent servo track (bottom servo track). A binary bit is encoded based on the phases of the servo bursts in any suitable manner. In the embodiment shown in FIG. 3A, a zero bit is encoded when the phase of the servo burst is either 0 degrees or 90 degrees, and a one bit is encoded when the phase of the servo burst is either 180 degrees or 270 degrees. FIG. 3B shows an orthogonal phase servo pattern wherein the phases are changed in the bottom servo track to record a different binary sequence.

Figure 3C:
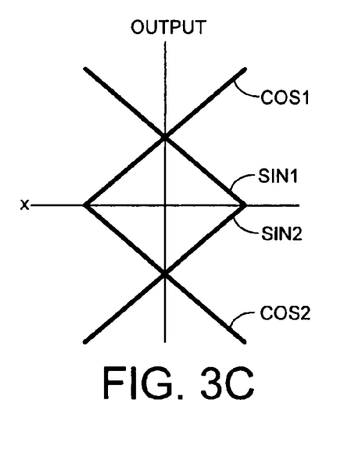
FIGS. 3C and 3D illustrate how the orthogonal phase servo pattern is demodulated to generate the PES according to an embodiment of the present invention.
Figure 3D:
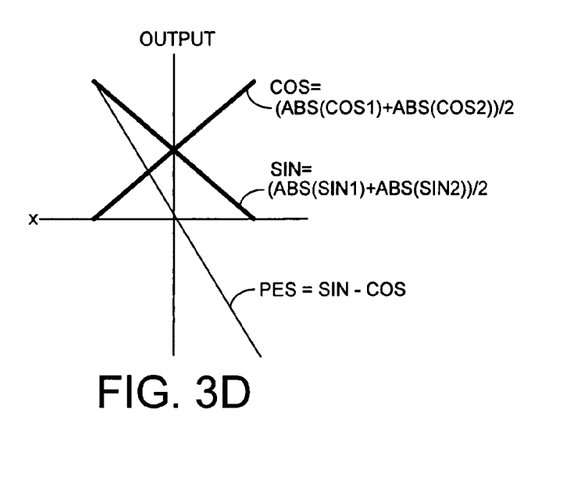

FIG. 3C illustrates the output of the read signal as the read element 22A of the head moves radially over the disk. When the read element 22A is centered over the top servo track of FIG. 3A, the absolute magnitude of the COS 1(0°) signal and the COS 2(180°) signal are maximum, and the absolute magnitude of the SIN 1(90°) signal and the SIN 2(270°) signal are minimum. As the read element 22A moves radially over the disk toward the bottom servo track of FIG. 3A, the absolute magnitudes of the signals flip as shown in FIG. 3C. The position error signal (PES) is therefore generated as the difference between the SIN and COS components which are computed as shown in FIG. 3D.

Figure 2B:
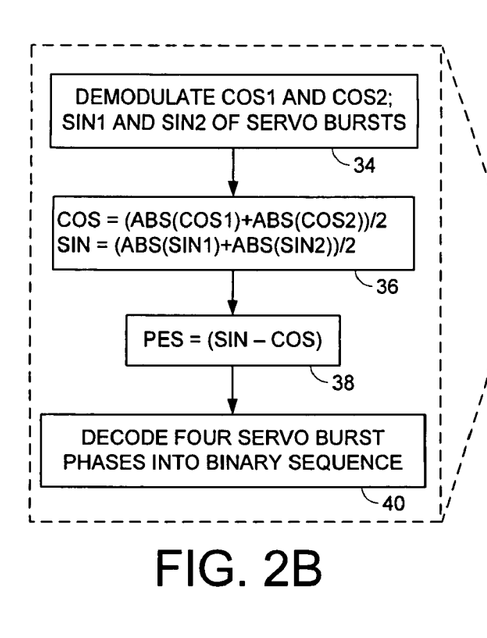
FIG. 2B is a flow diagram executed by the control circuitry according to an embodiment of the present invention wherein the servo bursts are demodulated into a position error signal (PES) for servoing the head, and decoded into a binary sequence by demodulating the phases of the servo bursts.

FIG. 2B shows a flow diagram executed by the control circuitry 26 according to an embodiment of the present invention for generating the PES and the binary sequence by demodulating the orthogonal servo pattern of FIG. 3A. The control circuitry processes the read signal to demodulate the COS 1 and COS 2 signals and the SIN 1 and SIN 2 signals (step 34). A COS component is computed in response to the COS 1 and COS 2 signals and a SIN component is computed in response to the SIN 1 and SIN 2 signals (step 36). The PES is generated as the difference between the SIN and COS components (step 38), and the four phases of the servo bursts are decoded into a binary sequence (step 40).

Figure 4A:
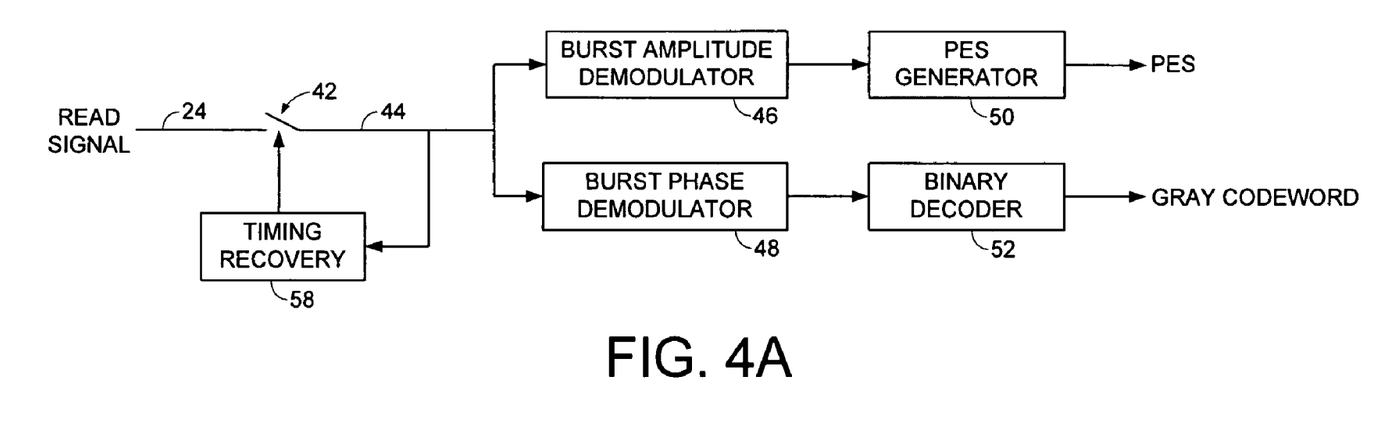
FIGS. 4A and 4B show control circuitry according to an embodiment of the present invention for demodulating the read signal into the PES and decoding the phases of the servo bursts into a binary sequence.

Any suitable control circuitry 26 may be employed to demodulate the servo bursts of the servo sectors to generate the PES, as well as decode the phases into the binary sequence. FIG. 4A shows example control circuitry wherein the read signal 24 is sampled 42 to generate signal sample values 44, and the signal sample values 44 are processed by a burst amplitude demodulator 46 and a burst phase demodulator 48. The burst amplitude demodulator 46 may comprise any suitable circuitry, such as an integrator for integrating the signal sample values 44 when the servo bursts comprise a quadrature servo pattern, or a cosine/sine demodulator when the servo bursts comprise a phase based servo pattern, such as an orthogonal phase servo pattern. Similarly, the burst phase demodulator 48 may comprise any suitable circuitry, such as a cosine/sine demodulator which extracts the cosine and sine components of the signal sample values 44 at the frequency of the servo bursts. A PES generator 50 processes the output of the burst amplitude detector 46 to generate the PES, for example, by comparing the burst amplitudes for a quadrature servo pattern, or by computing the PES as shown in FIG. 3C for a phase based servo pattern, such as an orthogonal phase servo pattern. A binary decoder 52 processes the output of the burst phase demodulator 48 in order to decode the binary sequence as described above.

Figure 4B:
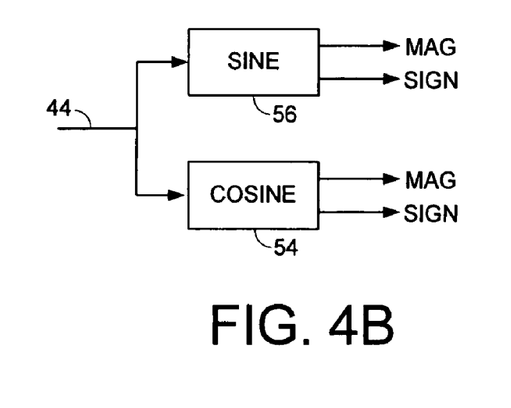

FIG. 4B shows an embodiment wherein the burst phase demodulator 48 comprises a cosine demodulator 54 and a sine demodulator 56 which extract the cosine and sine components (magnitude and sign) from the signal sample values 44. The cosine and sine demodulators may be implemented in any suitable manner, such as with a single point discrete time Fourier transform. In one embodiment, the burst phases for decoding the binary sequence are determined by selecting the highest absolute magnitude of the cosine and sine demodulators, and then by evaluating the sign of the selected servo bursts.

In FIG. 4A, the signal sample values 44 are synchronized to the frequency of the data recorded in the servo sectors (including the servo bursts) using a suitable timing recovery circuit 58. In the embodiment of FIG. 4A, the timing recovery circuit 58 comprises a phase locked loop which synchronizes the frequency of the sampling device 42 to the frequency of the servo data. However, any suitable timing recovery circuit 58 may be employed, such as an asynchronous sampling system employing an interpolation filter.

Figure 5A:
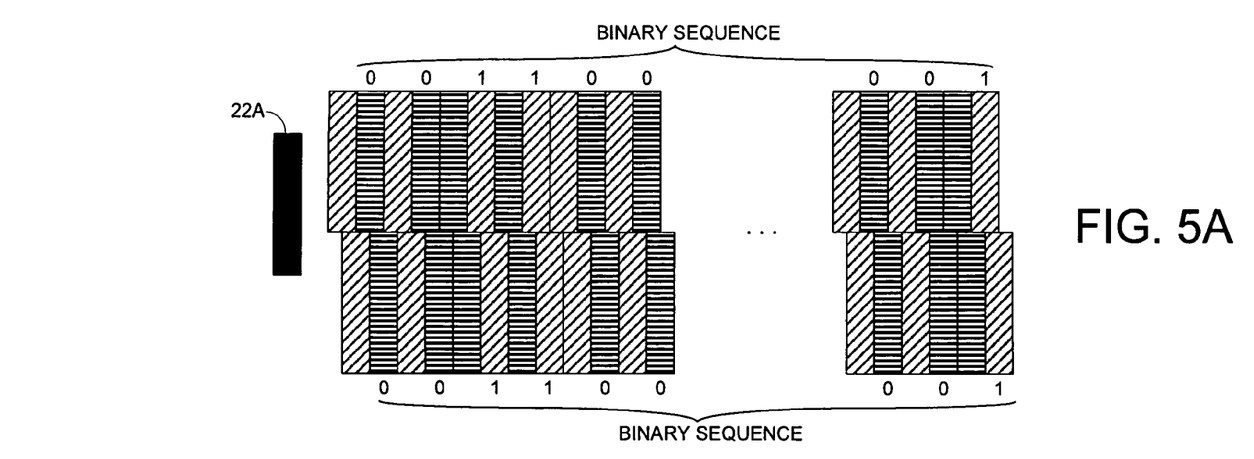
FIG. 5A shows an embodiment of the present invention wherein each servo burst comprises a plurality of burst cycles, and each burst cycle represents a bit in the binary sequence for a top and bottom servo track.
Figure 5B:
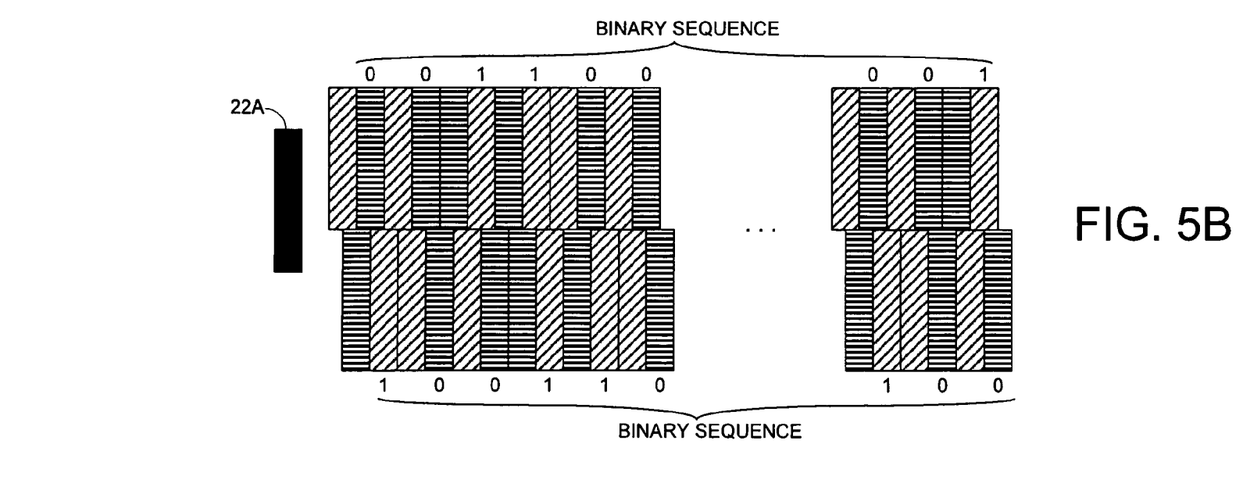
FIG. 5B shows an embodiment of the present invention wherein the phases of the servo burst cycles decode into a different binary sequence in the bottom servo track.

FIG. 5A shows an embodiment of the present invention wherein each servo burst comprises a plurality of burst cycles, and a single burst cycle of a servo burst represents a binary value of the binary sequence. Similar to FIG. 3A, in the embodiment of FIG. 5A a phase of 0 degrees or 90 degrees represents a zero bit in the binary sequence, and a phase of 180 degrees or 270 degrees represents a one bit in the binary sequence. The phase of the burst cycles may change as shown in FIG. 5A to encode the binary sequence without changing the resulting PES generated for servoing the head. Any suitable number of burst cycles may be used to represent each bit in the binary sequence (e.g., two burst cycles per bit), wherein using more burst cycles per bit may improve the signal-to-noise ratio (SNR) in detecting the binary sequence, as well as in generating the PES. FIG. 5B shows an embodiment of the present invention wherein the phases of the servo burst cycles decode into a different binary sequence in the bottom servo track.

When using the demodulation circuitry of FIG. 4B to demodulate the servo bursts of FIGS. 5A and 5B, the magnitude of each burst cycle is demodulated separately, and the individual absolute magnitudes are summed to generate the final absolute magnitude of the servo bursts for generating the PES as shown in FIG. 3D. The magnitudes and phases of the burst cycles are also evaluated individually in order to decode the burst cycles into the binary sequence.

Figure 6:
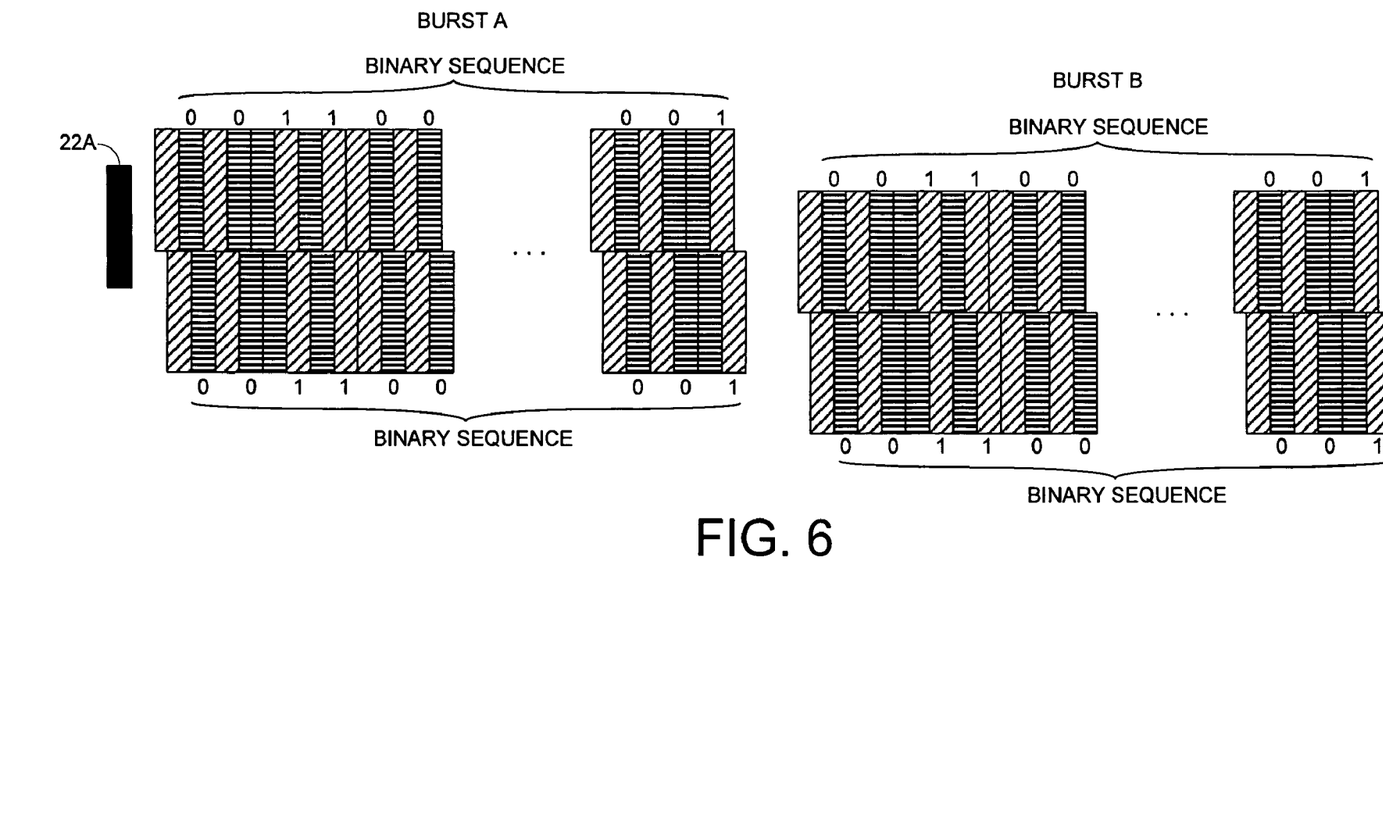
FIG. 6 shows an embodiment wherein the orthogonal pattern comprises two sets of servo bursts offset by one half of a servo track.

FIG. 6 shows an embodiment of the present invention wherein two sets of servo bursts (A burst and B burst) are used to define the servo tracks, wherein the two sets of servo bursts are offset radially by one half of a servo track in order to improve the accuracy of the PES when the read element 22A is between servo tracks. In the embodiment of FIG. 6, the binary sequences represented by the A and B servo bursts are the same, such that there is redundancy that may improve the detection accuracy. In another embodiment, the binary sequences represented by the A and B servo bursts are different (by recording different phases) which can double the length of the binary sequence.

In one embodiment, the binary sequence is decoded into a Gray codeword representing at least part of a servo track address. With a Gray code, only one bit in the binary sequence changes across servo tracks so that the binary sequence can be decoded unambiguously even when the head is positioned between servo tracks. For example, referring to the embodiment of FIG. 6, the length of the binary sequence representing a Gray codeword can extend over both the A and B servo bursts, wherein the entire Gray codeword can be decoded unambiguously even when the head is between servo tracks. Encoding at least part of a servo track address using the phases of the servo bursts increases the format efficiency of the disk by eliminating or decreasing the number of binary bits recorded in the servo data field 12 of a servo sector 12 (FIG. 1). However, the binary sequence encoded into the phases of the servo bursts may represent any suitable binary data, such as other forms of servo data (e.g., repeatable runout (RRO) data).

Figure 7A:
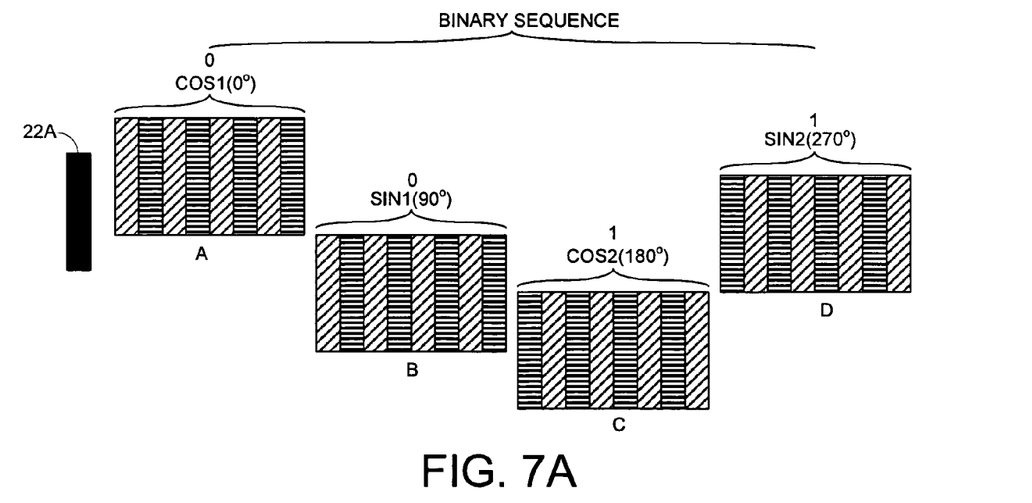
FIG. 7A shows a quadrature servo pattern having phases decoded into a binary sequence.
Figure 7B:
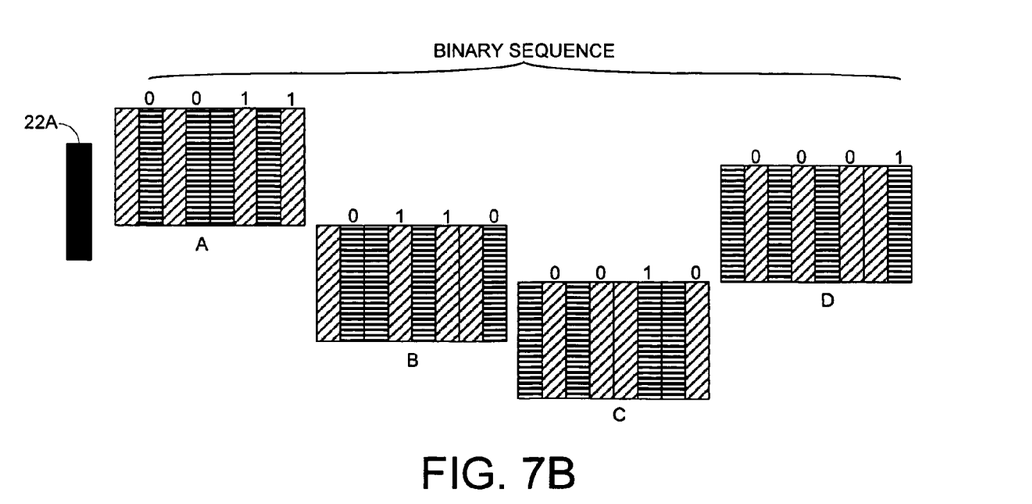
FIG. 7B shows an embodiment wherein each burst cycle of a quadrature servo burst is decoded into a binary bit.

Any suitable servo pattern may be employed in the embodiments of the present invention. FIG. 7A shows an embodiment of the present invention wherein a quadrature servo pattern is employed, wherein the phase of the servo burst are used to encode a binary sequence as shown. In the embodiment of FIG. 7A, each servo burst comprises a plurality of burst cycles comprising the same phase such that each servo burst represents a single bit of the binary sequence. In an alternative embodiment shown in FIG. 7B, each burst cycle represents a single bit in the binary sequence similar to the embodiment of FIG. 6.

Any suitable control circuitry may be employed to implement the flow diagrams in the embodiments of the present invention, such as any suitable integrated circuit or circuits, which may include a microprocessor executing the steps of a control program. In the embodiment where the control circuitry is implemented within a disk drive, it may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of servo tracks defined by a plurality of servo sectors, wherein
        each servo sector comprises a plurality of servo bursts; and
        each servo burst comprises at least one of four phases, wherein a first two of the phases are orthogonal, and a second two of the phases are orthogonal;
    a head actuated over the disk; and
    control circuitry operable to:
        read a servo sector to generate a read signal;
        process the read signal to demodulate the servo bursts into a position error signal (PES) representing an offset of the head from a target radial location on the disk; and
        process the read signal to decode at least two of the phases of the servo bursts into a binary sequence.

2. The disk drive as recited in claim 1, wherein:
    the first two of the four phases represent a first binary value; and
    the second two of the four phases represents a second binary value.

3. The disk drive as recited in claim 1, wherein the servo bursts comprise a quadrature servo pattern.

4. The disk drive as recited in claim 1, wherein the servo bursts comprise an orthogonal phase servo pattern.

5. The disk drive as recited in claim 4, wherein each servo burst comprises one of four phases selected from the group consisting of 0 degrees, 90 degrees, 180 degrees, and 270 degrees.

6. The disk drive as recited in claim 5, wherein:
    a first servo track comprises a first servo burst comprising 0 degrees phase and an adjacent servo track comprises a second servo burst comprising 90 degrees phase; and
    the first servo track comprises a third servo burst comprising 180 degrees phase and the adjacent servo track comprises a fourth servo burst comprising 270 degrees phase.

7. The disk drive as recited in claim 1, wherein:
    each servo burst comprises a plurality of burst cycles; and
    a plurality of burst cycles of a servo burst represents a binary value of the binary sequence.

8. The disk drive as recited in claim 7, wherein:
    each burst cycle comprises one of the four phases;
    a first two of the four phases represent a first binary value of the binary sequence; and
    a second two of the four phases represents a second binary value of the binary sequence.

9. The disk drive as recited in claim 1, wherein:
    each servo burst comprises a plurality of burst cycles; and
    a single burst cycle of a servo burst represents a binary value of the binary sequence.

10. The disk drive as recited in claim 9, wherein:
    a first two of the four phases represent a first binary value of the binary sequence; and
    a second two of the four phases represents a second binary value of the binary sequence.

11. The disk drive as recited in claim 1, wherein the control circuitry is further operable to decode the phases by:
    computing a sine component of the servo bursts; and
    computing a cosine component of the servo bursts.

12. The disk drive as recited in claim 11, wherein the control circuitry is further operable to decode the phases by evaluating a sign of the sine component and a sign of the cosine component.

13. The disk drive as recited in claim 1, wherein the phases of the servo bursts are decoded into a Gray codeword representing at least part of a servo track address.

14. A method of operating a disk drive, the disk drive comprising a disk comprising a plurality of servo tracks defined by a plurality of servo sectors, wherein
    each servo sector comprises a plurality of servo bursts; and
    each servo burst comprises at least one of four phases, wherein a first two of the phases are orthogonal, and a second two of the phases are orthogonal;
and a head actuated over the disk, the method comprising:
    reading a servo sector to generate a read signal;
    processing the read signal to demodulate the servo bursts into a position error signal (PES) representing an offset of the head from a target radial location on the disk; and
    processing the read signal to decode at least two of the phases of the servo bursts into a binary sequence.

15. The method as recited in claim 14, wherein:
    the first two of the four phases represent a first binary value; and
    the second two of the four phases represents a second binary value.

16. The method as recited in claim 14, wherein the servo bursts comprise a quadrature servo pattern.

17. The method as recited in claim 14, wherein the servo bursts comprise an orthogonal phase servo pattern.

18. The method as recited in claim 17, wherein each servo burst comprises one of four phases selected from the group consisting of 0 degrees, 90 degrees, 180 degrees, and 270 degrees.

19. The method as recited in claim 18, wherein:
    a first servo track comprises a first servo burst comprising 0 degrees phase and an adjacent servo track comprises a second servo burst comprising 90 degrees phase; and
    the first servo track comprises a third servo burst comprising 180 degrees phase and the adjacent servo track comprises a fourth servo burst comprising 270 degrees phase.

20. The method as recited in claim 14, wherein:
    each servo burst comprises a plurality of burst cycles; and
    a plurality of burst cycles of a servo burst represents a binary value of the binary sequence.

21. The method as recited in claim 20, wherein:
    each burst cycle comprises one of the four phases;
    a first two of the four phases represent a first binary value of the binary sequence; and
    a second two of the four phases represents a second binary value of the binary sequence.

22. The method as recited in claim 14, wherein:
each servo burst comprises a plurality of burst cycles; and
a single burst cycle of a servo burst represents a binary value of the binary sequence.

23. The method as recited in claim 22, wherein:
a first two of the four phases represent a first binary value of the binary sequence; and
a second two of the four phases represents a second binary value of the binary sequence.

24. The method as recited in claim 14, wherein decoding the phases comprises:
computing a sine component of the servo bursts; and
computing a cosine component of the servo bursts.

25. The method as recited in claim 24, wherein decoding the phases comprises evaluating a sign of the sine component and a sign of the cosine component.

26. The method as recited in claim 14, wherein the phases of the servo bursts are decoded into a Gray codeword representing at least part of a servo track address.

* * * * *